US010372432B2

(12) United States Patent
Huang et al.

(10) Patent No.: US 10,372,432 B2
(45) Date of Patent: Aug. 6, 2019

(54) APPLICATION INSTALLATION PACKAGE OBTAINING METHOD, INFORMATION BROADCAST METHOD, MOBILE DEVICE, AND BASE STATION

(71) Applicant: Huawei Technologies Co., Ltd., Shenzhen (CN)

(72) Inventors: Jiejing Huang, Shenzhen (CN); Huangwei Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 76 days.

(21) Appl. No.: 15/564,957

(22) PCT Filed: Nov. 9, 2015

(86) PCT No.: PCT/CN2015/094092
§ 371 (c)(1),
(2) Date: Oct. 6, 2017

(87) PCT Pub. No.: WO2017/079866
PCT Pub. Date: May 18, 2017

(65) Prior Publication Data
US 2018/0107468 A1 Apr. 19, 2018

(51) Int. Cl.
*G06F 8/61* (2018.01)
*H04L 29/08* (2006.01)
(Continued)

(52) U.S. Cl.
CPC ............. *G06F 8/61* (2013.01); *H04L 29/08* (2013.01); *H04W 8/24* (2013.01); *H04W 8/245* (2013.01); *H04W 48/10* (2013.01)

(58) Field of Classification Search
None
See application file for complete search history.

(56) References Cited

U.S. PATENT DOCUMENTS

2006/0041509 A1    2/2006  Koerber
2015/0089050 A1*   3/2015  Kudo ..................... H04W 4/50
                                                                709/224
(Continued)

FOREIGN PATENT DOCUMENTS

CN         1754149 A      3/2006
CN       102215118 A     10/2011
(Continued)

OTHER PUBLICATIONS

Machine Translation and Abstract of Chinese Publication No. CN104053128, Sep. 17, 2014, 10 pages.
(Continued)

*Primary Examiner* — Philip Wang
(74) *Attorney, Agent, or Firm* — Conley Rose, P.C.

(57) ABSTRACT

An application installation package obtaining method includes receiving, by a mobile device, a broadcast frame sent by a base station, where the broadcast frame includes application identification information and network access information. The application installation package obtaining method includes accessing, by the mobile device, a network according to the network access information included in the broadcast frame. The application installation package obtaining method includes obtaining, by the mobile device from the base station by using the network, an installation package of an application identified by the application identification information.

14 Claims, 8 Drawing Sheets

(51) Int. Cl.
*H04W 8/24* (2009.01)
*H04W 48/10* (2009.01)

(56) References Cited

U.S. PATENT DOCUMENTS

| | | | | |
|---|---|---|---|---|
| 2016/0301699 | A1* | 10/2016 | Wang | H04L 63/10 |
| 2017/0076583 | A1* | 3/2017 | Hua | G08B 25/016 |
| 2017/0094484 | A1* | 3/2017 | Li | H04L 51/24 |
| 2017/0127119 | A1* | 5/2017 | Woo | H04N 21/2668 |
| 2017/0372387 | A1* | 12/2017 | Cheng | G06Q 20/227 |
| 2018/0352415 | A1* | 12/2018 | Ma | H04W 4/00 |

FOREIGN PATENT DOCUMENTS

| | | |
|---|---|---|
| CN | 103857009 A | 6/2014 |
| CN | 104008498 A | 8/2014 |
| CN | 104053128 A | 9/2014 |
| CN | 104182250 A | 12/2014 |
| CN | 104461658 A | 3/2015 |
| CN | 104486755 A | 4/2015 |
| CN | 204288752 U | 4/2015 |

OTHER PUBLICATIONS

Machine Translation and Abstract of Chinese Publication No. CN104182250, Dec. 3, 2014, 7 pages.
Machine Translation and Abstract of Chinese Publication No. CN104486755, Apr. 1, 2015, 7 pages.
Machine Translation and Abstract of Chinese Publication No. CN204288752, Apr. 22, 2015, 8 pages.
Foreign Communication From a Counterpart Application, PCT Application No. PCT/CN2015/094092, English Translation of International Search Report dated Aug. 1, 2016, 2 pages.
Machine Translation and Abstract of Chinese Publication No. CN102215118, Oct. 12, 2011, 29 pages.
Machine Translation and Abstract of Chinese Publication No. CN103857009, Jun. 11, 2014, 10 pages.
Machine Translation and Abstract of Chinese Publication No. CN104008498, Aug. 27, 2014, 7 pages.
Machine Translation and Abstract of Chinese Publication No. CN104461658, Mar. 25, 2015, 14 pages.
Foreign Communication From a Counterpart Application, Chinese Application No. 201580049230.X, Chinese Office Action dated Apr. 22, 2019, 6 pages.

* cited by examiner

APPLICATION INSTALLATION PACKAGE OBTAINING METHOD, INFORMATION BROADCAST METHOD, MOBILE DEVICE, AND BASE STATION

CROSS-REFERENCE TO RELATED APPLICATION

This application is a National Stage of International Application No. PCT/CN2015/094092, filed on Nov. 9, 2015, which is hereby incorporated by reference in its entirety.

TECHNICAL FIELD

Embodiments of the present disclosure relate to the field of communications technologies, and in particular, to an application installation package obtaining method, an information broadcast method, a mobile device, and a base station.

BACKGROUND iBeacon is a new function that is developed by Apple Inc. in September, 2013 and that is configured for an operating system of a mobile device. The iBeacon uses a Bluetooth low energy (BLE) technology, and specifically uses a broadcast frame named "advertisement frame" (Advertising) in BLE. The advertisement frame is a frame that is periodically sent, and can be received by any device that supports the BLE. The iBeacon is implemented by inserting data in an Apple-defined format into a payload of this advertisement frame. iBeacon data mainly includes four types of information: a universally unique identifier (UUID), a major value, a minor value, and measured power.

The UUID is a 128-bit identifier specified in the ISO/IEC11578:1996 standard.

The major value and the minor value are independently set by an iBeacon developer, and both of them are 16-bit identifiers.

The measured power is a reference received signal strength indicator (RSSI) when an iBeacon module and a receiver are at a one-meter distance from each other. The receiver calculates a distance between the sending module and the receiver according to the reference RSSI and received signal strength.

When arriving at a store for which an iBeacon base station is deployed, a mobile device receives a broadcast frame sent by the iBeacon base station. When a merchant application is installed on the mobile device, a corresponding merchant icon is presented in a lower left corner of a lock screen of the mobile device, and according to an iBeacon push rule, the application on the mobile device obtains advertising messages such as a corresponding merchant discount and order from a merchant server. If a corresponding merchant application is not installed on the mobile device, an icon of an application store app store is presented on a screen of the mobile device. When a user taps the icon of the app store, the application store is entered, and the user is prompted to download an installation package of the merchant application. After downloading and installation are completed, the application on the mobile device obtains advertising messages such as a corresponding merchant discount and order from a merchant server.

It can be learned from the foregoing description that when an application of a corresponding merchant is not installed on a mobile device, after receiving a broadcast frame sent by a base station, the mobile device needs to use data traffic of a user to connect to a network, then downloads an installation package of the application from an application store and installs the installation package of the application, and after installation is completed, obtains advertising information of the merchant by using the application. In this process, a relatively long waiting time of the user needs to be consumed, and the data traffic of the user is also consumed.

SUMMARY

In view of this, embodiments of the present disclosure provide an application installation package obtaining method, an information broadcast method, a mobile device, and a base station, so as to save data traffic of a user, reduce a waiting time of the user, and improve user experience.

According to a first aspect, an embodiment of the present disclosure provides an application installation package obtaining method, including:

receiving, by a mobile device, a broadcast frame sent by a base station, where the broadcast frame includes application identification information and network access information;

accessing, by the mobile device, a network according to the network access information included in the broadcast frame; and obtaining, by the mobile device from the base station by using the network, an installation package of an application identified by the application identification information.

With reference to the first aspect, in a first implementation of the first aspect, the method further includes:

sending, by the mobile device, an application icon obtaining request to an application store server, where the application icon obtaining request includes the application identification information; and receiving and displaying, by the mobile device, an icon that is returned by the application store server and that is of the application identified by the application identification information.

With reference to the first implementation of the first aspect, in a second implementation of the first aspect, the method further includes:

obtaining, by the mobile device, an application installation request initiated by a user; and installing, by the mobile device, the application based on the installation package of the application.

With reference to the first aspect, in a third implementation of the first aspect, the method further includes:

sending, by the mobile device, verification information of the installation package of the application to an application store server, so as to request the application store server to verify whether the installation package of the application is valid.

With reference to the first aspect, in a fourth implementation of the first aspect, the method further includes:

obtaining, by the mobile device from an application store server, verification information of the installation package of the application identified by the application identification information; and verifying, by the mobile device according to the verification information of the installation package of the application, whether the obtained installation package of the application is valid.

According to a second aspect, an embodiment of the present disclosure provides an information broadcast method, including:

setting, by a base station, network access information in a broadcast frame, where the broadcast frame further includes application identification information;

sending, by the base station, the broadcast frame to a mobile device, so that the mobile device accesses a network according to the network access information included in the broadcast frame;

receiving, by the base station, an installation package obtaining request sent by the mobile device, where the installation package obtaining request includes the application identification information; and sending, by the base station to the mobile device by using the network, an installation package of an application identified by the application identification information.

With reference to the second aspect, in a first implementation of the second aspect, the broadcast frame further includes valid duration in which the network access information is used to access the network.

According to a third aspect, an embodiment of the present disclosure provides a mobile device, including:

a communications unit, configured to receive a broadcast frame sent by a base station, where the broadcast frame includes application identification information and network access information; and a processing unit, configured to access a network according to the network access information included in the broadcast frame; where the communications unit is further configured to obtain, from the base station by using the network, an installation package of an application identified by the application identification information.

With reference to the third aspect, in a first implementation of the third aspect, the communications unit is further configured to: send an application icon obtaining request to an application store server, where the application icon obtaining request includes the application identification information, and receive an icon that is returned by the application store server and that is of the application identified by the application identification information; and the mobile device further includes a display unit, and the display unit is configured to display the icon of the application.

With reference to the first implementation of the third aspect, in a second implementation of the third aspect, the communications unit is further configured to obtain an application installation request initiated by a user; and the processing unit is further configured to install the application based on the installation package of the application.

With reference to the third aspect, in a third implementation of the third aspect, the communications unit is further configured to send verification information of the installation package of the application to an application store server, so as to request the application store server to verify whether the installation package of the application is valid.

With reference to the third aspect, in a fourth implementation of the third aspect, the communications unit is further configured to obtain, from an application store server, verification information of the installation package of the application identified by the application identification information; and the processing unit is further configured to verify, according to the verification information of the installation package of the application, whether the obtained installation package of the application is valid.

According to a fourth aspect, an embodiment of the present disclosure provides a mobile device, including a processor and a memory, where the processor and the memory are connected by using a bus, the memory stores an instruction that is used to implement the application installation package obtaining method according to any one of the first aspect or implementations of the first aspect, and the processor may execute the application installation package obtaining method according to any one of the first aspect or the implementations of the first aspect by invoking the instruction in the memory.

According to a fifth aspect, an embodiment of the present disclosure provides a base station, including:

a setting unit, configured to set network access information in a broadcast frame, where the broadcast frame further includes application identification information; and a communications unit, configured to: send the broadcast frame to a mobile device, so that the mobile device accesses a network according to the network access information included in the broadcast frame, receive an installation package obtaining request sent by the mobile device, where the installation package obtaining request includes the application identification information, and send, to the mobile device by using the network, an installation package of an application identified by the application identification information.

With reference to the fifth aspect, in a first implementation of the fifth aspect, the broadcast frame further includes valid duration in which the network access information is used to access the network.

According to a sixth aspect, an embodiment of the present disclosure provides a base station, including a processor and a memory, where the processor and the memory are connected by using a bus, the memory stores an instruction that is used to implement the information broadcast method according to the fifth aspect or the first implementation of the fifth aspect, and the processor may execute the information broadcast method according to the fifth aspect or the first implementation of the fifth aspect by invoking the instruction in the memory.

According to a seventh aspect, an embodiment of the present disclosure provides an application installation package obtaining method, including:

receiving, by a mobile device, a broadcast frame sent by a base station, where the broadcast frame includes application identification information and network access information;

accessing, by the mobile device, a network according to the network access information included in the broadcast frame; and obtaining, by the mobile device from an application store server by using the network, an installation package of an application identified by the application identification information.

With reference to the seventh aspect, in a first implementation of the seventh aspect, the method further includes:

sending, by the mobile device, an application icon obtaining request to the application store server, where the application icon obtaining request includes the application identification information; and receiving and displaying, by the mobile device, an icon that is returned by the application store server and that is of the application identified by the application identification information.

With reference to the first implementation of the seventh aspect, in a second implementation of the seventh aspect, the method further includes:

obtaining, by the mobile device, an application installation request initiated by a user; and installing, by the mobile device, the application based on the installation package of the application.

With reference to the seventh aspect, or the first or the second implementation of the seventh aspect, in a third implementation of the seventh aspect, the broadcast frame further includes a uniform resource locator (URL) used to obtain the installation package of the application from the application store server; and the obtaining, by the mobile device from an application store server by using the network, an installation package of an application identified by the application identification information includes:

sending, by the mobile device, an installation package obtaining request to the base station, where the installation package obtaining request includes the URL and the application identification information, and after the base station checks that the URL is an accessible URL, the base station sends the installation package obtaining request to the application store server; and receiving, by the mobile device by using the network, the installation package that is returned by the application store server and that is of the application identified by the application identification information.

According to an eighth aspect, an embodiment of the present disclosure provides an information broadcast method, including:

setting, by a base station, network access information in a broadcast frame, where the broadcast frame further includes application identification information;

sending, by the base station, the broadcast frame to a mobile device, so that the mobile device accesses a network according to the network access information included in the broadcast frame;

receiving, by the base station, an installation package obtaining request sent by the mobile device, where the installation package obtaining request includes the application identification information; and sending, by the base station, the installation package obtaining request to an application store server, so that the application store server sends, to the mobile device by using the network, an installation package of an application identified by the application identification information.

With reference to the eighth aspect, in a first implementation of the eighth aspect, the broadcast frame further includes a URL used to obtain the installation package of the application from the application store server, the installation package obtaining request further includes the URL, and the method further includes:

checking, by the base station, whether the URL is an accessible URL; and if the URL is an accessible URL, performing, by the base station, a step of sending the installation package obtaining request to the application store server.

According to a ninth aspect, an embodiment of the present disclosure provides a mobile device, including:

a communications unit, configured to receive a broadcast frame sent by a base station, where the broadcast frame includes application identification information and network access information; and a processing unit, configured to access a network according to the network access information included in the broadcast frame; where the communications unit is further configured to obtain, from an application store server by using the network, an installation package of an application identified by the application identification information.

With reference to the ninth aspect, in a first implementation of the ninth aspect, the communications unit is further configured to: send an application icon obtaining request to the application store server, where the application icon obtaining request includes the application identification information, and receive an icon that is returned by the application store server and that is of the application identified by the application identification information; and the mobile device further includes a display unit, and the display unit is configured to display the icon of the application.

With reference to the first implementation of the ninth aspect, in a second implementation of the ninth aspect, the communications unit is further configured to obtain an application installation request initiated by a user; and the processing unit is further configured to install the application based on the installation package of the application.

With reference to the ninth aspect, or the first or the second implementation of the ninth aspect, in a third implementation of the ninth aspect, the broadcast frame further includes a URL used to obtain the installation package of the application from the application store server; and that the communications unit obtains, from the application store server by using the network, the installation package of the application identified by the application identification information specifically includes:

the communications unit sends an installation package obtaining request to the base station, where the installation package obtaining request includes the URL and the application identification information, and after the base station checks that the URL is an accessible URL, the base station sends the installation package obtaining request to the application store server; and the communications unit receives, by using the network, the installation package that is returned by the application store server and that is of the application identified by the application identification information.

According to a tenth aspect, an embodiment of the present disclosure provides a mobile device, including a processor and a memory, where the processor and the memory are connected by using a bus, the memory stores an instruction that is used to implement the application installation package obtaining method according to any one of the seventh aspect or implementations of the seventh aspect, and the processor may execute the application installation package obtaining method according to any one of the seventh aspect or the implementations of the seventh aspect by invoking the instruction in the memory.

According to an eleventh aspect, an embodiment of the present disclosure provides a base station, including:

a setting unit, configured to set network access information in a broadcast frame, where the broadcast frame further includes application identification information; and a communications unit, configured to: send the broadcast frame to a mobile device, so that the mobile device accesses a network according to the network access information included in the broadcast frame, receive an installation package obtaining request sent by the mobile device, where the installation package obtaining request includes the application identification information, and send the installation package obtaining request to an application store server, so that the application store server sends, to the mobile device by using the network, an installation package of an application identified by the application identification information.

With reference to the eleventh aspect, in a first implementation of the eleventh aspect, the broadcast frame further includes a URL used to obtain the installation package of the application from the application store server, the installation package obtaining request further includes the URL;

the base station further includes a check unit, and the check unit is configured to check whether the URL is an accessible URL; and the communications unit is further configured to: when a check result of the check unit is that the URL is an accessible URL, send the installation package obtaining request to the application store server, so that the application store server sends the installation package of the application identified by the application identification information to the mobile device.

According to a twelfth aspect, an embodiment of the present disclosure provides a base station, including a processor and a memory, where the processor and the memory are connected by using a bus, the memory stores an instruction that is used to implement the information broadcast method according to the eighth aspect or the first implementation of the eighth aspect, and the processor may execute the information broadcast method according to the eighth aspect or the first implementation of the eighth aspect by invoking the instruction in the memory.

It can be learned from the foregoing technical solutions that the embodiments of the present disclosure have the following advantages:

In the embodiments of the present disclosure, a broadcast frame received by a mobile device carries application identification information and network access information, and the mobile device accesses a network according to the network access information carried in the broadcast frame, obtains, from a base station by using the accessed network, an installation package of an application identified by the application identification information, and after installing the application based on the obtained installation package, may obtain advertising information of a corresponding merchant by using the application. In this process, the mobile device directly accesses the network by using the network access information carried in the broadcast frame and obtains the installation package of the application. Therefore, no data traffic of a user needs to be consumed, a waiting time of the user is reduced, and user experience is improved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

The following describes the technical solutions in the embodiments of the present disclosure with reference to the accompanying drawings in the embodiments of the present disclosure. The described embodiments are merely some rather than all of the embodiments of the present disclosure. All other embodiments obtained by persons of ordinary skill in the art based on the embodiments of the present disclosure without creative efforts shall fall within the protection scope of the present disclosure.

Figure 1:
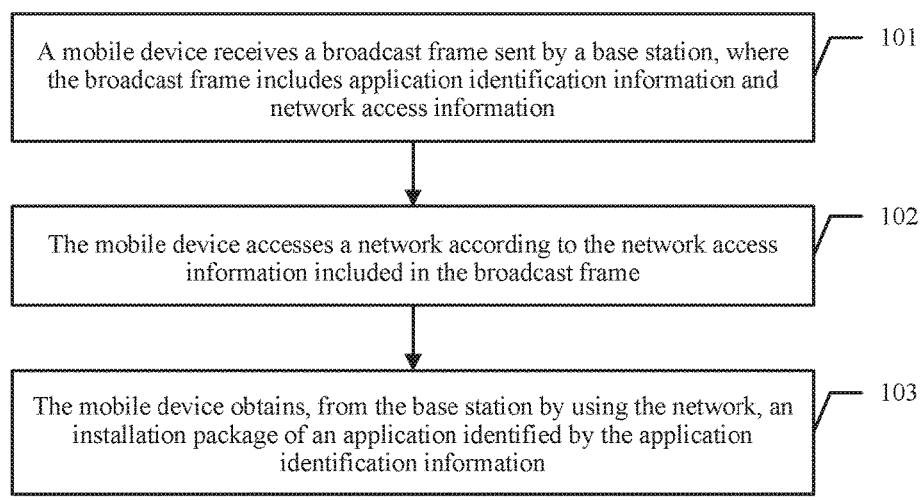
FIG. 1 is a schematic flowchart of an application installation package obtaining method according to an embodiment of the present disclosure.

Referring to FIG. 1, an embodiment of an application installation package obtaining method in the present disclosure includes the following steps.

101. A mobile device receives a broadcast frame sent by a base station, where the broadcast frame includes application identification information and network access information.

During specific implementation, the application identification information may be information, such as an identifier of an application (for example, a UUID of the application), or a name of an application, that is used to uniquely identify the application. The network access information may include a service set identifier (SSID), a password, and the like.

It can be learned from the description in the background that in the prior art, a broadcast frame mainly includes four types of information: a UUID, a major value, a minor value, and measured power. In this embodiment, it may be understood that network access information is newly added to an existing broadcast frame, and this may be specifically implemented by extending a field in the existing broadcast frame.

102. The mobile device accesses a network according to the network access information included in the broadcast frame.

103. The mobile device obtains an installation package of an application from the base station by using the network.

In this embodiment, a base station directly adds network access information to a broadcast frame and sends the network access information to a mobile device, and after receiving the broadcast frame, the mobile device may directly access a network according to the network access information carried in the broadcast frame, to obtain an installation package of an application from the base station.

Therefore, no data traffic of a user needs to be consumed, a waiting time of the user is reduced, and user experience is improved.

The following explains and describes, with reference to several specific embodiments, the application installation package obtaining method provided in the present disclosure.

Figure 2:
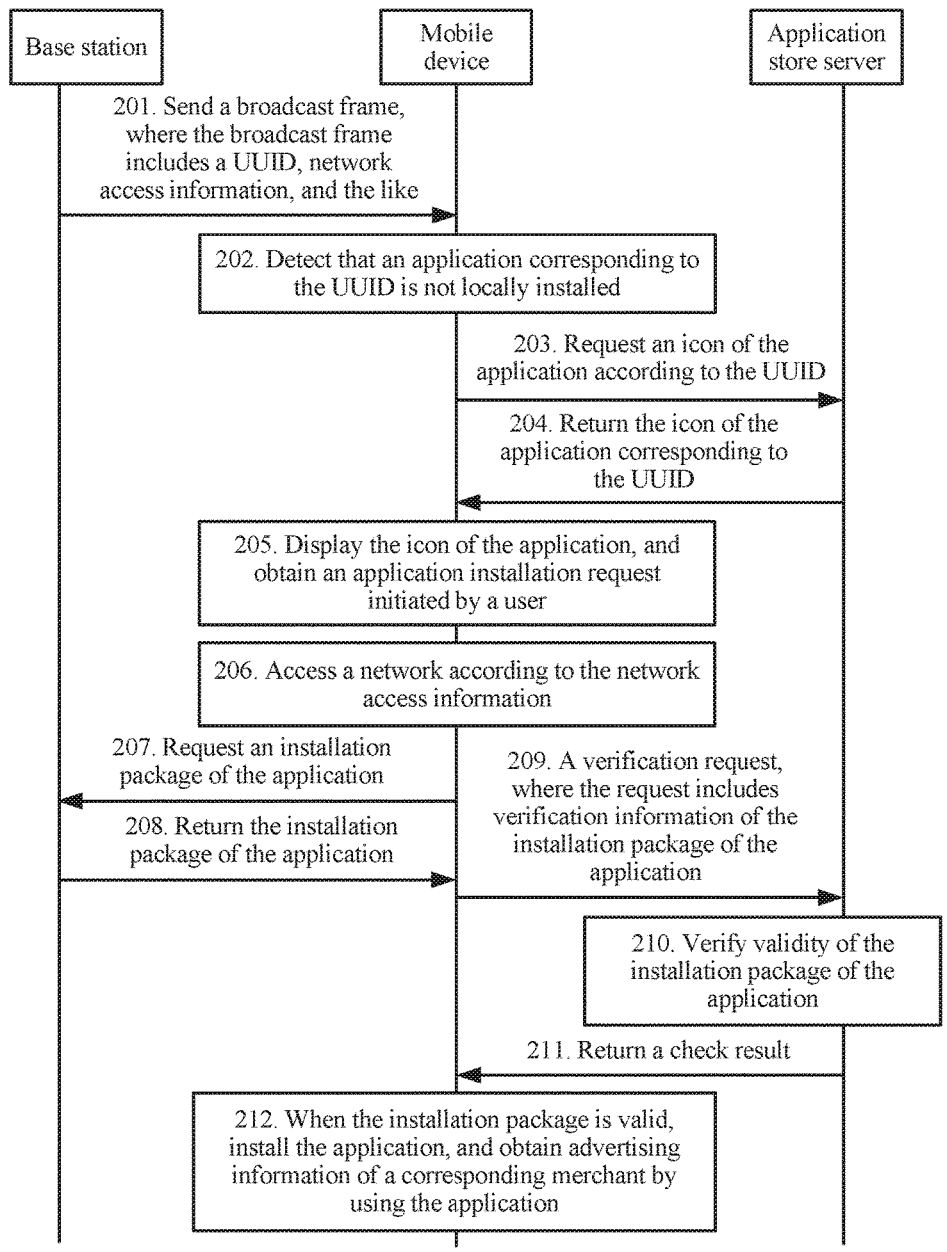
FIG. 2 is a signaling diagram of an application installation package obtaining method according to an embodiment of the present disclosure.

Referring to FIG. 2, FIG. 2 is a signaling diagram of an application installation package obtaining method according to an embodiment of the present disclosure. The method in this embodiment includes the following steps.

201. A base station sends a broadcast frame to a mobile device.

The broadcast frame carries application identification information and network access information. In addition, the broadcast frame may further carry information such as a major value, a minor value, and measured power. In the following embodiment, an example in which the application identification information is a UUID is used for description.

202. The mobile device detects that an application corresponding to a UUID is not locally installed.

The UUID may be used to uniquely identify the application, and it may be determined, according to the UUID, whether the application is installed on the mobile device. That the application corresponding to the UUID is not installed on the mobile device may mean that the application identified by the UUID is not installed on the mobile device; or the application identified by the UUID is installed on the mobile device, but a version of the application is earlier than a version of an application on a base station side (in this case, the base station also needs to add information about the version of the application on the base station side to the broadcast frame). Certainly, if the application is installed on the mobile device, and the version of the application is later than the version of the application on the base station side, or the version of the application is the same as the version of the application on the base station side, it indicates that the application corresponding to the UUID is installed on the mobile device, and the information about the version of the application on the base station side does not need to be obtained from the base station.

203. The mobile device requests an icon of the application from an application store server according to the UUID.

204. The application store server returns the requested icon of the application to the mobile device.

205. The mobile device displays the icon of the application, and obtains an application installation request initiated by a user.

During specific implementation, the mobile device may display the icon of the application in a lower left corner of a lock screen, or display the icon of the application in a lower left corner of a screen on which an operation is currently being performed, or display the icon of the application by using a prompt box that pops up on a screen of the mobile device, so as to query the user whether to install the application. A specific display manner is not specifically limited herein.

The user may initiate the application installation request by tapping the icon of the application, or tapping an install button, or the like.

206. The mobile device accesses a network according to network access information.

207. The mobile device requests an installation package of the application from the base station.

208. The base station returns the requested installation package of the application to the mobile device.

209. The mobile device sends a verification request to the application store server, where the request includes verification information of the installation package of the application.

Because the installation package of the application is obtained from the base station, to ensure validity of the installation package, the mobile device needs to request the application store server to verify whether the installation package that is of the application and that is obtained from the base station is valid. The verification information of the installation package of the application may be a hash value, signature information, or the like of the installation package of the application.

210. The application store server verifies whether the installation package of the application is valid.

The application store server receives the verification information of the installation package of the application from the mobile device, and compares the verification information with a hash value, signature information, or the like of a corresponding installation package, of an application, on the application store server. If the verification information is the same as the hash value, the signature information, or the like, it is determined that the installation package that is of the application and that is obtained from the base station is a valid installation package.

211. The application store server returns a verification result to the mobile device.

211. When the installation package is valid, the mobile device installs the application based on the installation package, and obtains advertising information of a corresponding merchant by using the application.

During specific implementation, the mobile device may independently verify validity of the installation package. That is, when requesting the icon of the application from the application store server, the mobile device may also request the verification information of the installation package of the application from the application store server, and after the mobile device obtains the installation package of the application from the base station, the mobile device directly verifies, according to the verification information obtained from the application store server, whether the installation package that is of the application and that is obtained from the base station is valid. For another processing procedure, refer to the foregoing embodiment, and details are not described herein again.

It should be noted that in the foregoing embodiment, steps 203 to 205 may be performed between step 206 and step 207, or may be performed between step 208 and step 209, or may even be performed between step 211 and step 212. This is not specifically limited herein.

Figure 3:
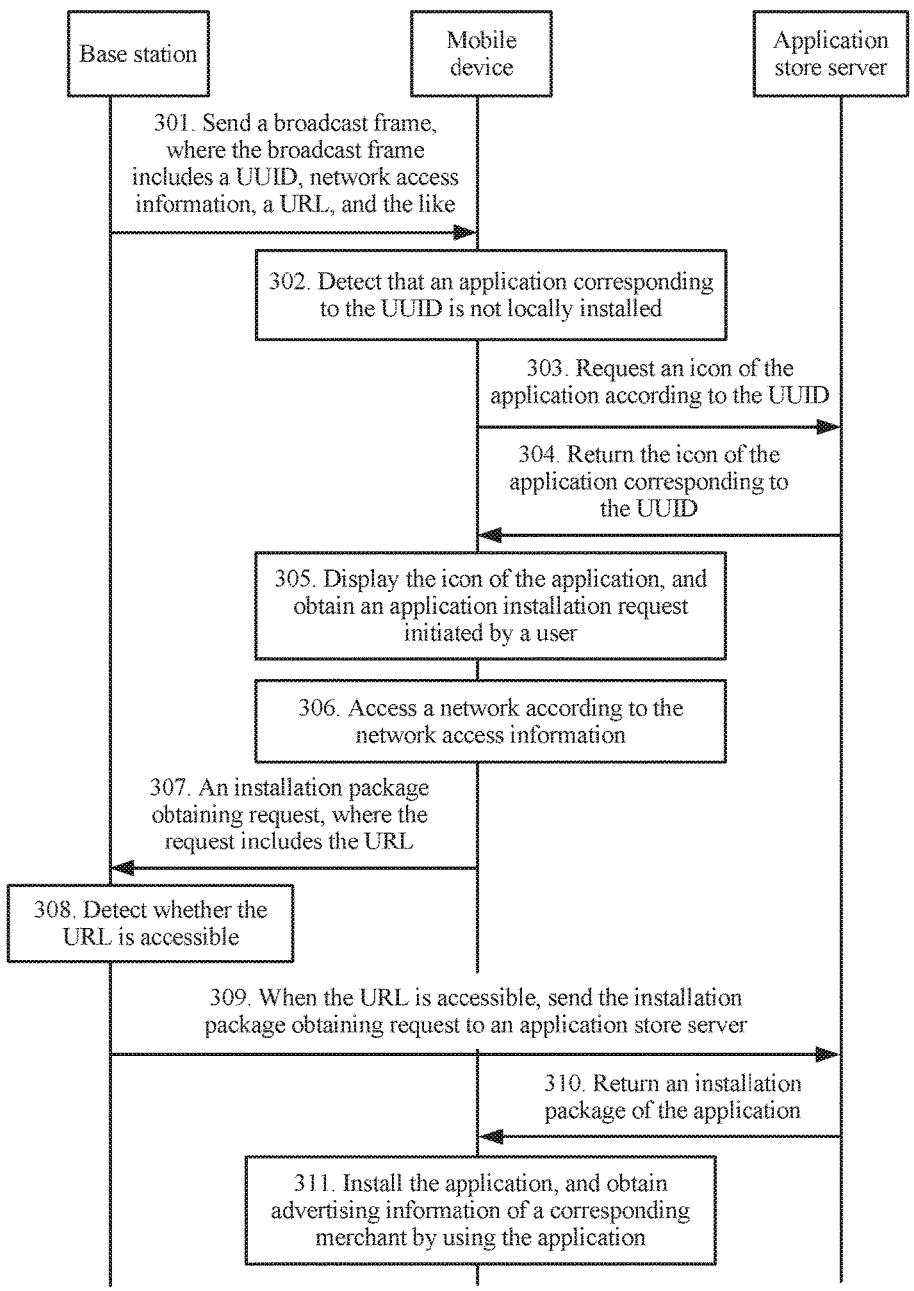
FIG. 3 is a signaling diagram of an application installation package obtaining method according to another embodiment of the present disclosure.

The foregoing embodiment describes a method in which a mobile device accesses a network based on network access information carried in a broadcast frame, to obtain an installation package of an application from a base station. In another embodiment of the present disclosure, alternatively, a mobile device may access a network based on network access information carried in a broadcast frame, to obtain an installation package of an application from an application store server. Referring to FIG. 3, the method in this embodiment includes the following steps.

301. A base station sends a broadcast frame to the mobile device.

The broadcast frame carries network access information, application identification information including UUID, a major value, a minor value, and measured power, and the like. In addition, in this case, the broadcast frame further needs to carry a URL used to obtain an installation package of the application from the application store server.

302. The mobile device detects that an application corresponding to a UUID is not locally installed.

303. The mobile device requests an icon of the application from the application store server according to the UUID.

304. The application store server returns the requested icon of the application to the mobile device.

305. The mobile device displays the icon of the application, and obtains an application installation request initiated by a user.

306. The mobile device accesses a network according to network access information.

307. The mobile device sends an application installation package obtaining request to the base station.

The installation package obtaining request includes the URL and the application identification information.

308. The base station checks whether a URL included in the request is an accessible URL.

If the URL included in the request is a URL for obtaining the application corresponding to the UUID from the application store server, the URL included in the request is an accessible URL. Alternatively, if the URL included in the request is the same as the URL included in the broadcast frame sent by the base station to the mobile device, the URL included in the request is an accessible URL.

309. When the URL is an accessible URL, the base station sends the obtaining request to the application store server.

310. The application store server returns a requested installation package of the application to the mobile device.

311. The mobile device installs the application based on the installation package, and obtains advertising information of a corresponding merchant by using the application.

In the foregoing embodiment, steps 303 to 305 may be performed between step 306 and step 307, or performed between step 310 and step 311. This is not specifically limited herein.

In the foregoing embodiments, the broadcast frame may further carry information such as valid duration and a valid range, and this is not specifically limited herein. The valid duration may be available duration in which the mobile device accesses the network according to the network access information. The valid range may be a distance within which the mobile device can access the network by using the network access information.

During specific implementation, with reference to the foregoing several specific embodiments, in addition to the UUID, the major value, the minor value, the measured power, and the network access information, the broadcast frame may carry an installation package obtaining manner. The installation package obtaining manner may include obtaining the installation package from the base station by using the network (for example, a value 0 in the broadcast frame may be used to represent the obtaining manner), or obtaining the installation package from the application store server by using the network (for example, a value 1 in the broadcast frame may be used to represent the obtaining manner). Alternatively, the obtaining manner is not limited (for example, a value 2 in the broadcast frame may be used to represent the obtaining manner). When a value that is carried in the broadcast frame and that is used to indicate the installation package obtaining method is 2, the user needs to select an obtaining manner. For example, the user may choose to obtain the installation package from the application store server, or obtain the installation package from another third-party device (for example, another mobile device).

Figure 4A:
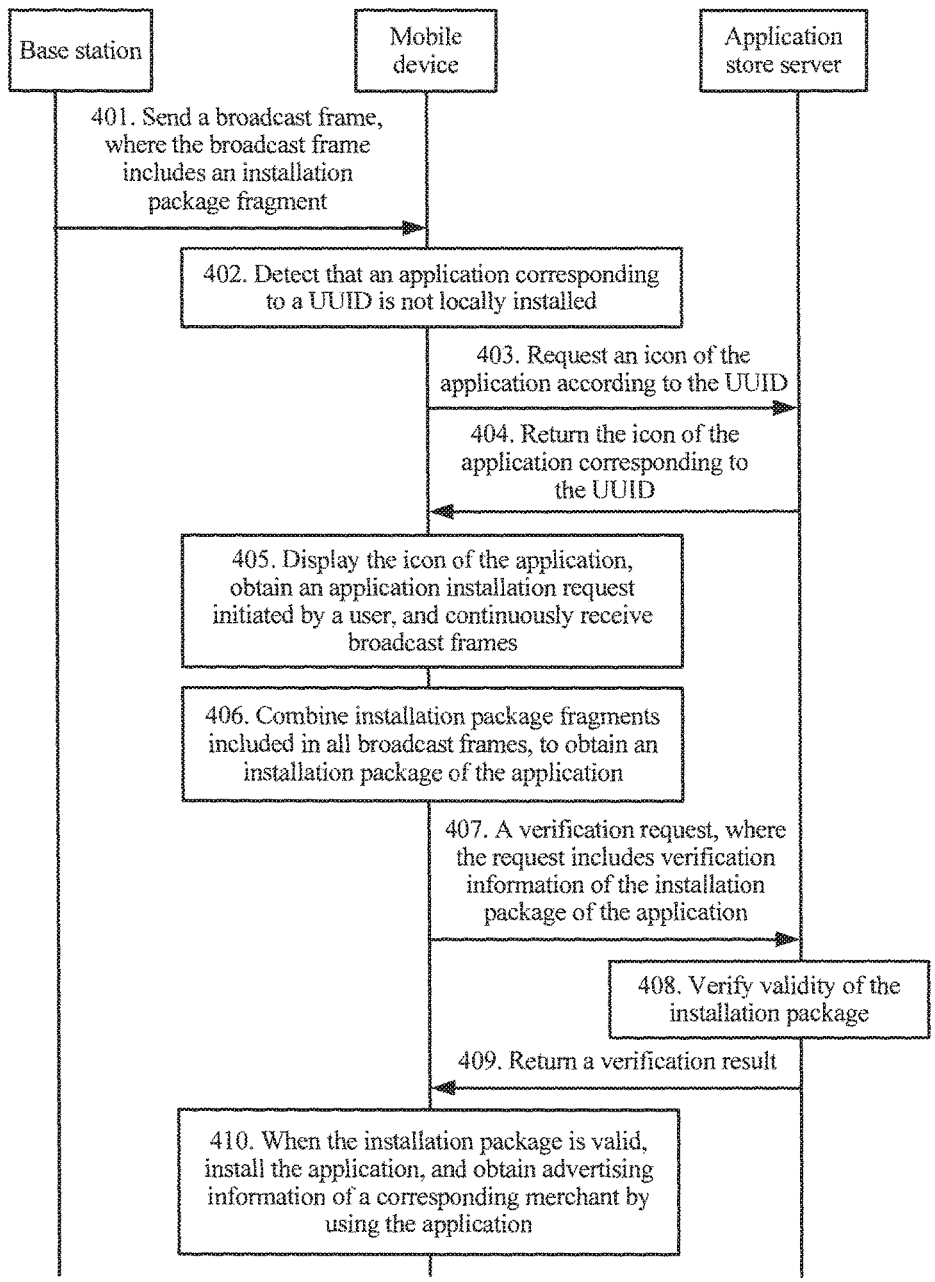
FIG. 4A is a signaling diagram of an application installation package obtaining method according to still another embodiment of the present disclosure.

The foregoing several embodiments describe methods in which a broadcast frame carries network access information, and a mobile device accesses a network according to the network access information, to obtain an installation package of an application. During specific implementation, the broadcast frame may further carry an installation package fragment, and the mobile device may directly obtain the installation package of the application by parsing the broadcast frame. For a specific process, refer to FIG. 4A. The process includes the following steps.

401. A base station sends a broadcast frame to the mobile device.

The broadcast frame carries a UUID, a major value, a minor value, measured power, and an installation package fragment. Specifically, one base station may continuously send, to the mobile device, broadcast frames that carry different installation package fragments, or multiple base stations may separately send, to the mobile device, broadcast frames that carry different installation package fragments, so that an installation package of an application can be obtained. In this case, broadcast frames sent by different base stations include different installation package fragments. In this embodiment, an example in which one base station continuously sends broadcast frames to the mobile device, so that an installation package of an application can be obtained is mainly used for description.

402. The mobile device detects that an application corresponding to a UUID is not locally installed.

403. The mobile device requests an icon of the application from an application store server according to the UUID.

404. The application store server returns the requested icon of the application to the mobile device.

405. The mobile device displays the icon of the application, obtains an application installation request initiated by a user, and continuously receives broadcast frames.

After the icon of the application is displayed on the mobile device, if the user taps the icon of the application, or the user triggers an install button of the application, it indicates that the user expects to install the application. In this case, the mobile device continuously receives the broadcast frames sent by the base station until all installation package fragments of the application are received.

Figure 4B:
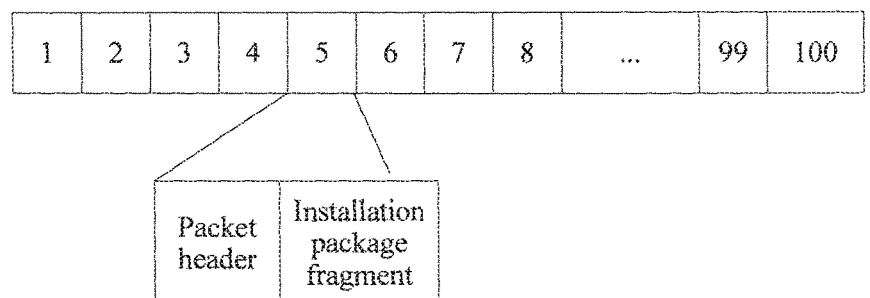
FIG. 4B is a schematic diagram of an installation package fragment according to the present disclosure.

During specific implementation, the broadcast frame further carries a packet header of the installation package fragment, and the mobile device may learn, according to a packet header of each received installation package fragment, whether all the installation package fragments of the application are received. For example, as shown in FIG. 4B, the base station may split one installation package of 10 M into 100 fragments, and each broadcast frame carries one fragment and a packet header corresponding to the fragment.

406. The mobile device combines installation package fragments included in all broadcast frames, to obtain an installation package of the application.

407. The mobile device sends a verification request to the application store server, where the request includes verification information of the installation package of the application.

Because the installation package of the application is obtained from the base station, to ensure validity of the installation package, the mobile device needs to request the application store server to verify whether the installation package that is of the application and that is obtained from the base station is valid. The verification information of the installation package of the application may be a hash value, signature information, or the like of the installation package of the application.

408. The application store server verifies whether the installation package of the application is valid.

The application store server receives the verification information of the installation package of the application from the mobile device, and compares the verification information with information such as a hash value, a signature, or the like of a corresponding installation package, of an application, on the application store server. If the verification information is the same as the information, it is determined that the installation package that is of the application and that is obtained from the base station is a valid installation package.

409. The application store server returns a verification result to the mobile device.

410. When the installation package is valid, the mobile device installs the application based on the installation package, and obtains advertising information of a corresponding merchant by using the application.

During specific implementation, the mobile device may independently verify validity of the installation package. That is, when requesting the icon of the application from the application store server, the mobile device may also request the verification information of the installation package of the application from the application store server, and after the mobile device obtains the installation package of the application from the base station, the mobile device directly verifies, according to the verification information obtained from the application store server, whether the installation package that is of the application and that is obtained from the base station is valid. For another processing procedure, refer to the foregoing embodiment, and details are not described herein again.

If installation package fragments of the application are sent by multiple base stations to the mobile device, after receiving broadcast frames sent by the multiple base stations, the mobile device may obtain all the installation package fragments of the application by parsing all the received broadcast frames, and may obtain the installation package of the application by combining all the installation package fragments of the application. In this case, validity of the obtained installation package of the application still needs to be verified. For a specific processing procedure, refer to the foregoing description, and details are not described herein again.

In another feasible implementation, the base station may add the complete installation package of the application to the broadcast frame, and send the complete installation package of the application to the mobile device, and the mobile device may obtain the installation package of the application by parsing the broadcast frame.

In this embodiment of the present disclosure, because the broadcast frame sent by the base station carries the installation package of the application or the installation package fragment, if the base station is still an existing iBeacon base station, transmit power of the existing iBeacon base station needs to be increased, and a corresponding storage module needs to be added to store the installation package of the application or the installation package fragment.

In addition, in another feasible implementation, the advertising information of the merchant may be directly added to the broadcast frame and sent to the mobile device. A specific process may be as follows.

Step 1: The base station broadcasts a normal broadcast frame, where the broadcast frame carries a UUID, a major value, a minor value, measured power, and the like.

Step 2: The mobile device receives the broadcast frame sent by the base station, and detects that an application corresponding to the UUID is not locally installed.

If the application is locally installed, advertising information of a merchant is directly obtained by using the application.

Step 3: The mobile device feeds information back to the current base station, to notify the base station that there is no corresponding application on the mobile device.

Step 4: After receiving the information fed back by the mobile device, the base station adds advertising information to a broadcast frame, and sends, to the mobile device, the broadcast frame that carries the advertising information.

Step 5: The mobile device receives the broadcast frame, extracts the advertising information from the broadcast frame, and displays the advertising information on the mobile device.

Figure 5:
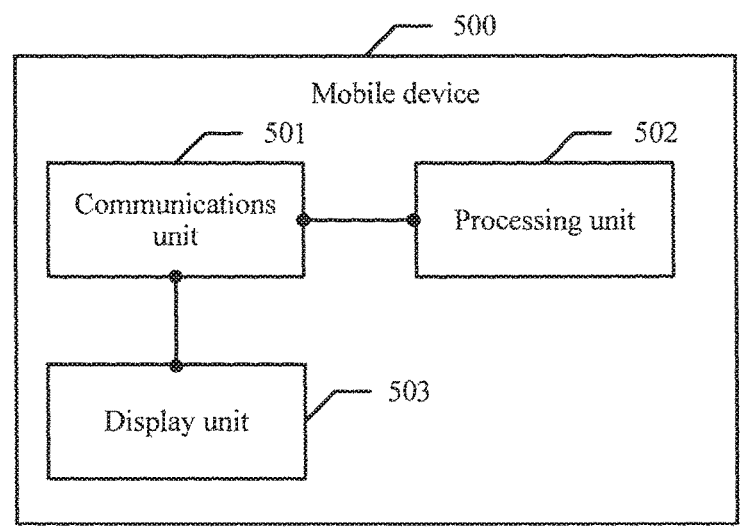
FIG. 5 is a schematic structural diagram of a mobile device according to an embodiment of the present disclosure.

The following describes a mobile device provided in the embodiments of the present disclosure. The mobile device provided in the embodiments of the present disclosure may include but be not limited to a device such as a mobile phone or a tablet computer. A mobile device for implementing the method embodiment shown in FIG. 2 is first described. Referring to FIG. 5, a mobile device 500 includes:

a communications unit 501, configured to receive a broadcast frame sent by a base station, where the broadcast frame includes application identification information and network access information; and a processing unit 502, configured to access a network according to the network access information included in the broadcast frame; where the communications unit 501 is further configured to obtain, from the base station by using the network, an installation package of an application identified by the application identification information.

The communications unit 501 is further configured to: send an application icon obtaining request to an application store server, where the application icon obtaining request includes the application identification information, and receive an icon that is returned by the application store server and that is of the application identified by the application identification information; and the mobile device further includes a display unit 503, and the display unit 503 is configured to display the icon of the application.

The communications unit 501 is further configured to obtain an application installation request initiated by a user; and the processing unit 502 is further configured to install the application based on the installation package of the application.

The communications unit 501 is further configured to send verification information of the installation package of the application to an application store server, so as to request the application store server to verify whether the installation package of the application is valid.

The communications unit 501 is further configured to obtain verification information of the installation package of the application from an application store server; and the processing unit 502 is further configured to verify, according to the verification information of the installation package of the application, whether the obtained installation package of the application is valid.

The broadcast frame further includes valid duration in which the network access information is used to access the network.

The mobile device described in this embodiment of the present disclosure may be configured to execute the method in the embodiment shown in FIG. 2. For a technical process thereof, refer to the detailed description in the embodiment corresponding to FIG. 2, and details are not described herein again.

In this embodiment, a broadcast frame received by a mobile device carries network access information, and the mobile device directly accesses a network by using the network access information carried in the broadcast frame, to obtain an installation package of an application. Therefore, no data traffic of a user needs to be consumed, a waiting time of the user is reduced, and user experience is improved.

Figure 6:
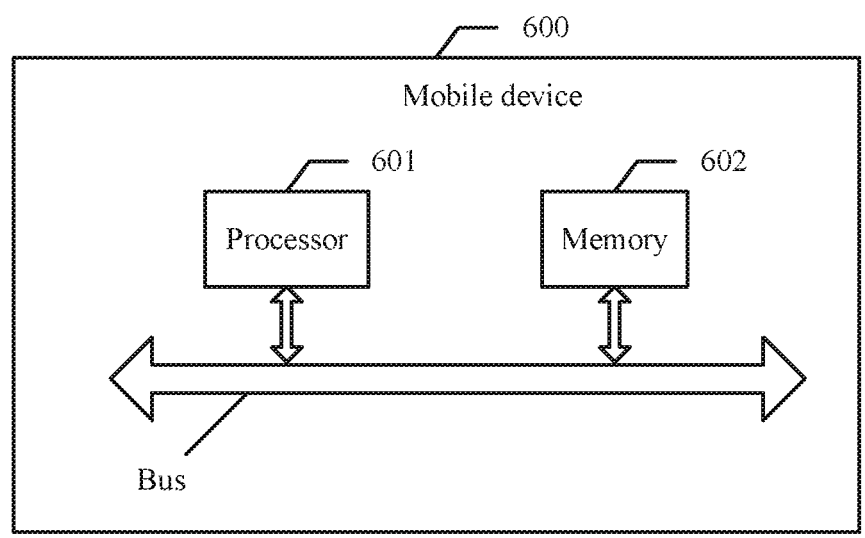
FIG. 6 is a schematic structural diagram of a mobile device according to another embodiment of the present disclosure.

FIG. 6 is another embodiment of a mobile device according to the present disclosure. A mobile device 600 includes a processor 601 and a memory 602. The processor 601 and the memory 602 are connected by using a bus. The memory 602 stores an instruction that is used to implement the application installation package obtaining method shown in the embodiment in FIG. 2. The processor 601 may execute, by invoking the instruction stored in the memory 602, the application installation package obtaining method in the embodiment shown in FIG. 2.

The mobile device described in this embodiment of the present disclosure may execute the application installation package obtaining method described in the embodiment in FIG. 2. For a technical implementation process and a technical effect thereof, refer to the detailed description in the embodiment shown in FIG. 2, and details are not described herein again.

Figure 7:
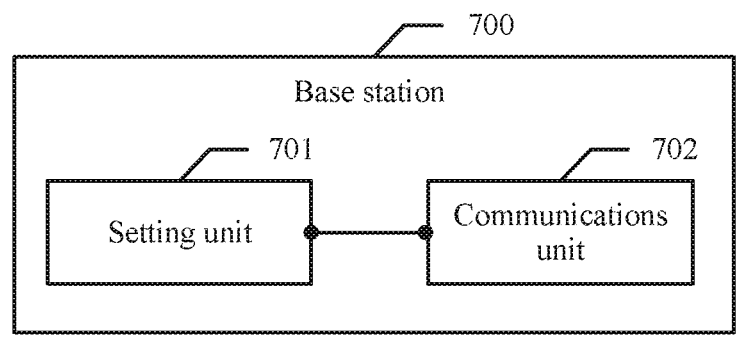
FIG. 7 is a schematic structural diagram of a base station according to an embodiment of the present disclosure.

The following describes a base station for implementing the method embodiment shown in FIG. 2. Referring to FIG. 7, a base station 700 in this embodiment may be an iBeacon base station, and the base station 700 includes:

a setting unit 701, configured to set network access information in a broadcast frame, where the broadcast frame further includes application identification information; and a communications unit 702, configured to: send the broadcast frame to a mobile device, so that the mobile device accesses a network according to the network access information included in the broadcast frame, receive an installation package obtaining request sent by the mobile device, where the installation package obtaining request includes the application identification information, and send, to the mobile device by using the network, an installation package of an application identified by the application identification information.

The broadcast frame further includes valid duration in which the network access information is used to access the network.

The base station provided in this apparatus embodiment may be configured to perform an operation procedure in the method embodiment corresponding to FIG. 2, and details are not described herein again.

In this embodiment, a base station sets network access information in a broadcast frame, and sends the broadcast frame to a mobile device, so that after receiving the broadcast frame, the mobile device directly accesses a network by using the network access information carried in the broadcast frame, to obtain an installation package of an application. Therefore, no data traffic of a user needs to be consumed, a waiting time of the user is reduced, and user experience is improved.

Figure 8:
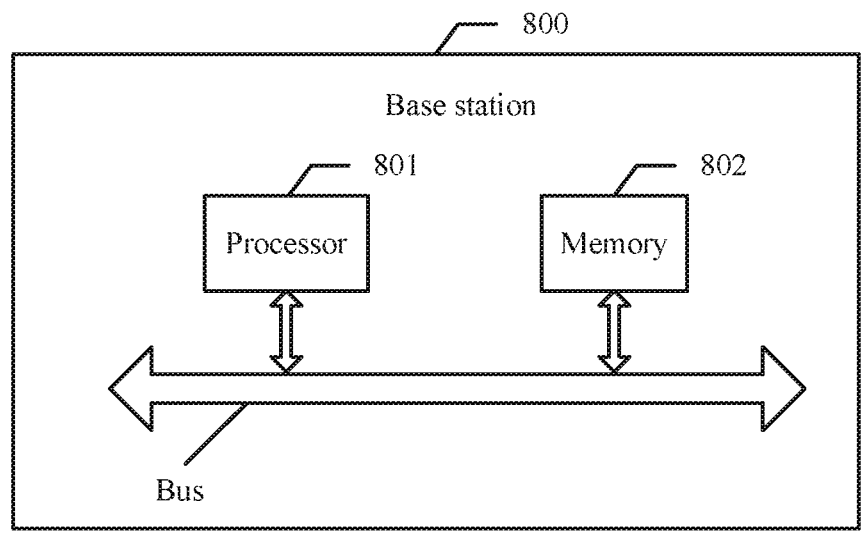
FIG. 8 is a schematic structural diagram of a base station according to another embodiment of the present disclosure.

FIG. 8 is another embodiment of a base station according to the present disclosure. A base station 800 includes a processor 801 and a memory 802. The processor 801 and the memory 802 are connected by using a bus. The memory 802 stores an instruction that is used to implement the information broadcast method shown in the embodiment in FIG. 2. The processor 801 may execute, by invoking the instruction stored in the memory 802, the information broadcast method in the embodiment shown in FIG. 2.

The base station described in this embodiment of the present disclosure may execute the information broadcast method described in the embodiment in FIG. 2. For a technical implementation process and a technical effect thereof, refer to the detailed description in the embodiment shown in FIG. 2, and details are not described herein again.

Figure 9:
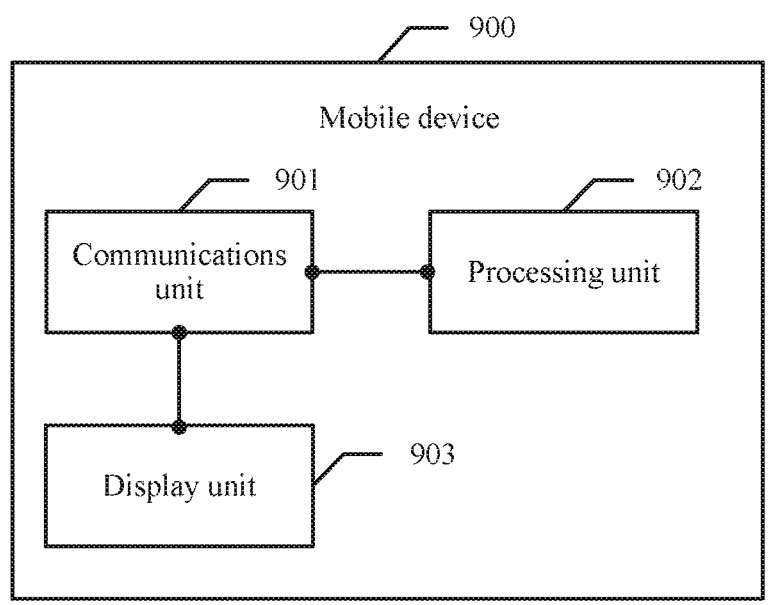
FIG. 9 is a schematic structural diagram of a mobile device according to another embodiment of the present disclosure.

Referring to FIG. 9, a mobile device 900 for implementing the method embodiment shown in FIG. 3 includes:

a communications unit 901, configured to receive a broadcast frame sent by a base station, where the broadcast frame includes application identification information and network access information; and a processing unit 902, configured to access a network according to the network access information included in the broadcast frame; where the communications unit 901 is further configured to obtain, from an application store server by using the network, an installation package of an application identified by the application identification information.

The communications unit 901 is further configured to: send an application icon obtaining request to the application store server, where the application icon obtaining request includes the application identification information, and receive an icon that is returned by the application store server and that is of the application identified by the application identification information; and the mobile device further includes a display unit 903, configured to display the icon of the application.

The communications unit 901 is further configured to obtain an application installation request initiated by a user; and the processing unit 902 is further configured to install the application based on the installation package of the application.

Specifically, the broadcast frame further includes a URL used to obtain the installation package of the application from the application store server; and that the communications unit 901 obtains the installation package of the application from the application store server by using the network specifically includes:

the communications unit 901 sends a request for obtaining the installation package of the application to the base station, where the obtaining request includes the URL and the application identification information, and after the base station checks that the URL is an accessible URL, the base station sends the obtaining request to the application store server; and the communications unit 901 receives, by using the network, the installation package that is of the application and that is returned by the application store server.

Figure 10:
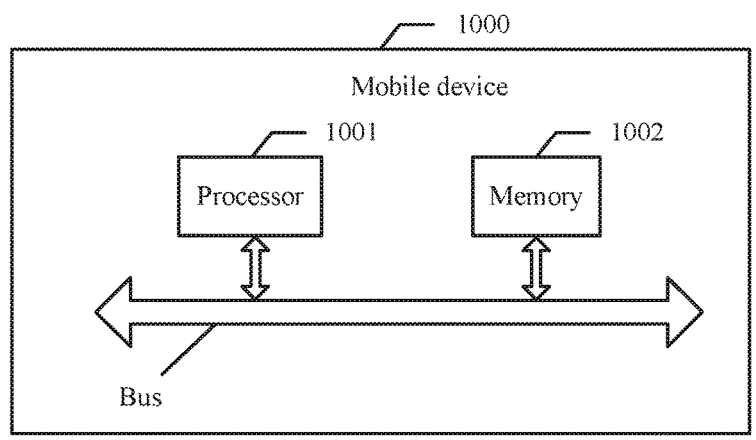
FIG. 10 is a schematic structural diagram of a base station according to another embodiment of the present disclosure.

FIG. 10 is another embodiment of a mobile device according to the present disclosure. A mobile device 1000 includes a processor 1001 and a memory 1002. The processor 1001 and the memory 1002 are connected by using a bus. The memory 1002 stores an instruction that is used to implement the application installation package obtaining method shown in the embodiment in FIG. 3. The processor 1001 may execute, by invoking the instruction stored in the memory 1002, the application installation package obtaining method in the embodiment shown in FIG. 3.

The mobile device described in this embodiment of the present disclosure may execute the application installation package obtaining method described in the embodiment in FIG. 3. For a technical implementation process and a technical effect thereof, refer to the detailed description in the embodiment shown in FIG. 3, and details are not described herein again.

Figure 11:
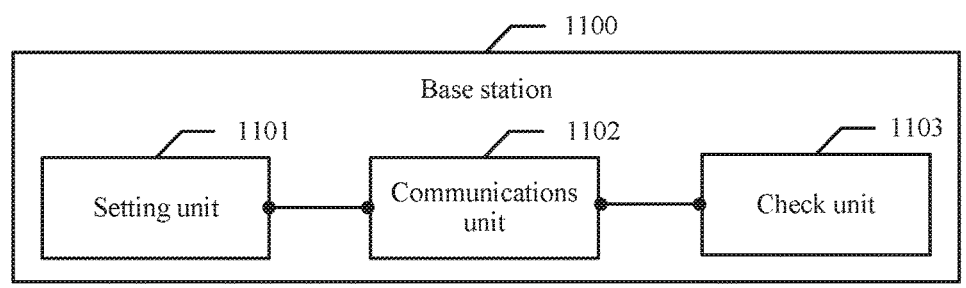
FIG. 11 is a schematic structural diagram of a mobile device according to another embodiment of the present disclosure.

Referring to FIG. 11, a base station 1100 for implementing the method embodiment shown in FIG. 3 includes:

a setting unit 1101, configured to set network access information in a broadcast frame, where the broadcast frame further includes application identification information; and a communications unit 1102, configured to: send the broadcast frame to a mobile device, so that the mobile device accesses a network according to the network access information included in the broadcast frame, receive an installation package obtaining request sent by the mobile device, where the installation package obtaining request includes the application identification information, and send the installation package obtaining request to an application store server, so that the application store server sends, to the mobile device by using the network, an installation package of an application identified by the application identification information.

The broadcast frame further includes a URL used to obtain the installation package of the application from the application store server, and the installation package obtaining request further includes the URL.

The base station 1100 further includes a check unit 1103, and the check unit 1103 is configured to check whether the URL is an accessible URL; and the communications unit 1102 is further configured to: when a check result of the check unit 1103 is that the URL is an accessible URL, send the obtaining request to the application store server, so that the application store server sends the installation package of the application to the mobile device.

Figure 12:
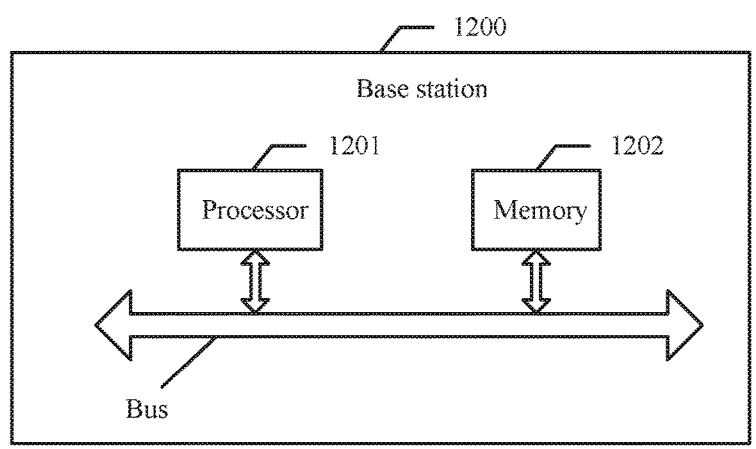
FIG. 12 is a schematic structural diagram of a base station according to another embodiment of the present disclosure.

FIG. 12 is another embodiment of a base station according to the present disclosure. A base station 1200 includes a processor 1201 and a memory 1202. The processor 1201 and the memory 1202 are connected by using a bus. The memory 1202 stores an instruction that is used to implement the information broadcast method shown in the embodiment in FIG. 3. The processor 1201 may execute, by invoking the instruction stored in the memory 1202, the information broadcast method in the embodiment shown in FIG. 3.

The base station described in this embodiment of the present disclosure may execute the information broadcast method described in the embodiment in FIG. 3. For a technical implementation process and a technical effect thereof, refer to the detailed description in the embodiment shown in FIG. 3, and details are not described herein again.

In addition, the mobile device and the base station provided in the embodiments of the present disclosure may be further configured to execute other content in the method embodiments, and details are not described herein again.

It should be noted that the described apparatus embodiment is merely an example. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided in the present disclosure, connection relationships between modules indicate that the modules have communication connections to each other, which may be specifically implemented as one or more communications buses or signal cables. Persons of ordinary skill in the art may understand and implement the embodiments of the present disclosure without creative efforts.

Based on the description of the foregoing implementations, persons skilled in the art may clearly understand that the present disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present disclosure, software program implementation is a better implementation in most cases. Based on such an understanding, the technical solutions of the present disclosure essentially or the part contributing to the prior art may be implemented in a form of a software product. The software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to execute the methods described in the embodiments of the present disclosure.

The foregoing describes in detail the application installation package obtaining method, the information broadcast method, the mobile device, and the base station that are provided in the embodiments of the present disclosure. Persons of ordinary skill in the art may make modifications to the specific implementations and the application scope according to the ideas of the embodiments of the present disclosure, and the specification shall not be construed as a limitation on the present disclosure.

What is claimed is:

1. An application installation package obtaining method, comprising:
   receiving, by a mobile device from a base station, a broadcast frame that comprises application identification information and network access information, wherein the broadcast frame that comprises the application identification information and the network access information is an extended broadcast frame that is extended to add the network access information to the broadcast frame;
   directly accessing, by the mobile device, a network according to the network access information in the broadcast frame;
   directly obtaining, by the mobile device from the base station via the network, an installation package of an application identified by the application identification information, wherein the installation package is directly obtained subsequent to the mobile device sending an installation package obtaining request to the base station; and
   installing, by the mobile device, the application based on the obtained installation package.

2. The method according to claim 1, wherein the method further comprises:
   sending, by the mobile device, an application icon obtaining request to an application store server, wherein the application icon obtaining request comprises the application identification information;

receiving, by the mobile device from the application store server, an icon that is of the application identified by the application identification information; and displaying by the mobile device, the icon.

3. The method according to claim 2, wherein the method further comprises:

obtaining, by the mobile device, an application installation request initiated by a user, and installing, by the mobile device, the application based on the installation package of the application.

4. The method according to claim 1, wherein the method further comprises sending, by the mobile device, verification information of the installation package of the application to an application store server to request the application store server to verify whether the installation package of the application is valid.

5. The method according to claim 1, wherein the method further comprises:

obtaining, by the mobile device from an application store server, verification information of the installation package of the application identified by the application identification information; and verifying, by the mobile device according to the verification information of the installation package of the application, whether the obtained installation package of the application is valid.

6. An application installation package obtaining method, comprising:

receiving, by a mobile device from a base station, a broadcast frame that comprises application identification information and network access information, wherein the broadcast frame that comprises the application identification information and the network access information is an extended broadcast frame that is extended to add the network access information to the broadcast frame;

directly accessing, by the mobile device, a network according to the network access information in the broadcast frame;

directly obtaining, by the mobile device from an application store server via the network, an installation package of an application identified by the application identification information, wherein the installation package is directly obtained subsequent to the mobile device sending an installation package obtaining request to the base station; and installing, by the mobile device, the application based on the obtained installation package.

7. The method according to claim 6, wherein the method further comprises:

sending, by the mobile device, an application icon obtaining request to the application store server, wherein the application icon obtaining request comprises the application identification information;

receiving, by the mobile device from the application store server, an icon of the application identified by the application identification information; and displaying, by the mobile device, the icon.

8. The method according to claim 7, wherein the method further comprises:

obtaining, by the mobile device, an application installation request initiated by a user, and installing, by the mobile device, the application based on the installation package of the application.

9. The method according to claim 6, wherein the broadcast frame further comprises a uniform resource locator (URL) used to obtain the installation package of the application from the application store server, and wherein obtaining the installation package by the mobile device comprises:

sending, by the mobile device, the installation package obtaining request to the base station, wherein the installation package obtaining request comprises the URL and the application identification information; and receiving, by the mobile device from the application store server via the network, the installation package.

10. A mobile device, comprising:

a bus;

a processor; and a memory coupled to the processor via the bus, wherein the memory stores instructions configured to be executed by the processor to cause the processor to:

receive a broadcast frame from a base station, wherein the broadcast frame comprises application identification information and network access information, wherein the broadcast frame that comprises the application identification information and the network access information is an extended broadcast frame that is extended to add the network access information to the broadcast frame;

directly access a network according to the network access information in the broadcast frame;

directly obtain, from the base station via the network, an installation package of an application identified by the application identification information, wherein the installation package is directly obtained subsequent to the mobile device sending an installation package obtaining request to the base station; and install the application based on the obtained installation package.

11. The mobile device according to claim 10, wherein the instructions are further configured to be executed by the processor to cause the processor to:

send an application icon obtaining request to an application store server, wherein the application icon obtaining request comprises the application identification information; and receive, from the application store server, an icon of the application identified by the application identification information.

12. The mobile device according to claim 10, wherein the instructions are further configured to be executed by the processor to cause the processor to:

obtain an application installation request initiated by a user, and install the application based on the installation package of the application.

13. The mobile device according to claim 10, wherein the instructions are further configured to be executed by the processor to cause the processor to send verification information of the installation package of the application to an application store server to request the application store server to verify whether the installation package of the application is valid.

14. The mobile device according to claim 10, wherein the instructions are further configured to be executed by the processor to cause the processor to:

obtain, from an application store server, verification information of the installation package of the application identified by the application identification information; and verify whether the obtained installation package of the application is valid according to the verification information of the installation package of the application.

* * * * *